United States Patent

[11] 3,561,490

[72] Inventor Jewel E. Little
P.O. Box 902, Pearland, Tex. 77581
[21] Appl. No. 803,543
[22] Filed Mar. 3, 1969
[45] Patented Feb. 9, 1971

[54] PIPELINE TESTING APPARATUS
6 Claims, 4 Drawing Figs.

[52] U.S. Cl. .................................................. 138/90,
73/49.1; 138/97; 220/24.5
[51] Int. Cl. ............................................. F16l 55/10,
G01m 3/08
[50] Field of Search ............................................ 138/90, 93,
97, 89; 73/49.1, 49.5, 49.6; 220/24.5

[56] References Cited
UNITED STATES PATENTS

| | | | |
|---|---|---|---|
| 3,503,424 | 3/1970 | Sawyer | 138/97 |
| 1,812,943 | 7/1931 | Granger | 73/49.1 |
| 2,607,370 | 8/1952 | Anderson | 138/90 |
| 2,953,919 | 9/1960 | Potts | 73/49.1X |
| 3,048,998 | 8/1962 | Gilreath | 73/49.1X |
| 3,194,466 | 7/1965 | Davis | 138/90X |
| 3,199,598 | 8/1965 | Loomis | 73/49.1X |
| 3,381,714 | 5/1968 | Johnson | 138/97 |

*Primary Examiner*—James Kee Chi
*Attorney*—Donald Gunn

ABSTRACT: For use in testing pipelines exposed to a variety of environmental conditions and soil conditions, an apparatus which preferably incorporates a structure which is pushed through the pipeline by the fluid therein and which incorporates means for centering the apparatus, means for expanding the apparatus to completely plug the pipeline, said last named means having a size which alternatively does not plug the pipeline to permit its movement, and said means holding the apparatus at a selected position while the pressure upstream from the apparatus is increased to a desired test level, and thereafter releasing to permit the apparatus to move further along the pipeline.

Jewel E. Little
INVENTOR

BY Donald Gunn
ATTORNEY

Jewel E. Little
INVENTOR

BY Donald Gunn

ATTORNEY

PIPELINE TESTING APPARATUS

SUMMARY OF PROBLEM AND SOLUTION

Many pipelines are hundreds, even thousands of miles in length. Under the normal use of a pipeline, the pipeline is exposed to substantially high pressures, typically in the range of 700 to 1,000 p.s.i. It is necessary, from time to time, to test a pipeline for leaks and to take whatever remedial steps are required. Leaks in pipelines are quite dangerous because products therein are typically pollutants and sometimes even explosive. For instance, natural gas transferred by pipeline is explosive when leaked. Many liquids are likewise flammable, and create quite a danger in this regard. Also, some liquid products are pollutants and hence, their escape from a pipeline might poison a stream, fresh water sand, or other sources of pure water. Because of these factors, it is considered expedient to test a pipeline against leaks.

With the problems in view, the preferred embodiment of the present invention is summarized as including a body which is adapted to be placed in a pipeline and which moves with the fluid flow therein. The body includes centering members which guide the apparatus and center it within the pipe. The body has a central passage therethrough to permit relief of upstream pressure to the pipe forward of the body. On increase of the upstream pressure above a predetermined level, the passage through the equipment is closed, and, on closure, slips are set to grasp the sidewall of the pipe where the apparatus is stopped. When the test apparatus is stopped, the upstream pressure is raised to a test pressure without any leakage past the apparatus of the present invention. At this juncture, a predetermined portion of the pipeline has been closed off and is tested for leaks against a quiescent high pressure with sure knowledge so that the leak is located in the span of the tested portion. The apparatus further includes means which release the pressure and thereafter move the apparatus further along the pipeline.

Many objects and advantages of the present invention will become more readily apparent from a consideration of the below-included specification and drawings, wherein.

Figure 1:
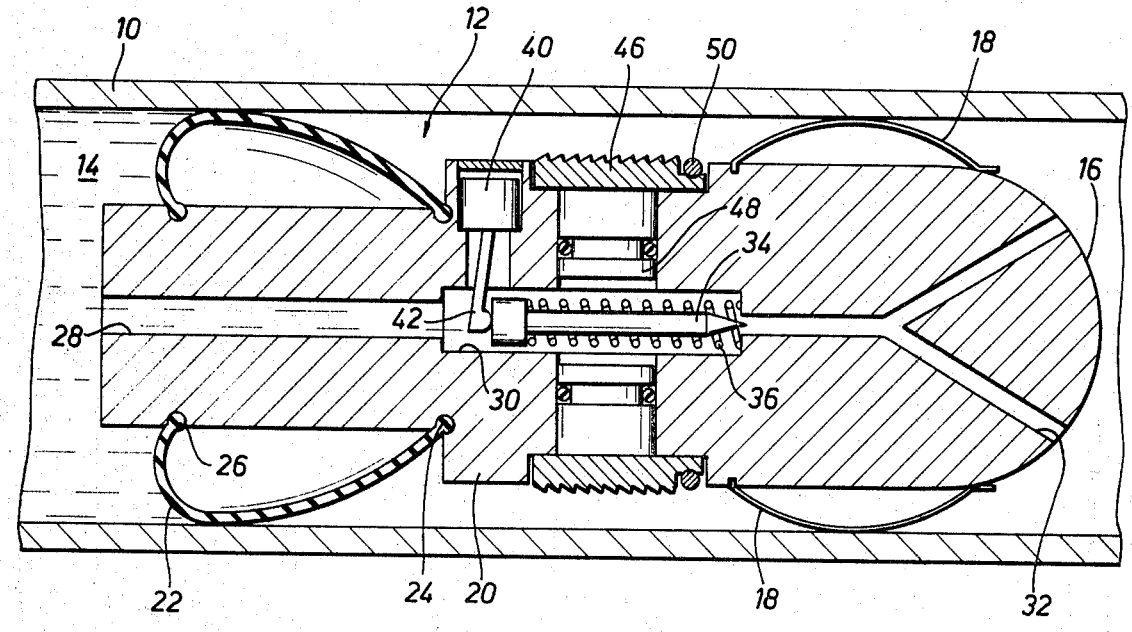
FIG. 1 is a sectional view of the preferred embodiment placed in a pipeline in position for moving along the length of the pipeline.

Attention is first directed to FIG. 1 of the drawings. In FIG. 1, the pipeline is indicated by the numeral 10 and the apparatus of the present invention is indicated by the numeral 12. Fluid in the pipeline is indicated by the numeral 14 and is pumped from a point upstream from the apparatus. The fluid flows downstream from the test apparatus. The apparatus 12 moves downstream at the urging of the pressure on the upstream side and hence a pressure drop occurs across the apparatus. By way of example and not limitation, the pressure upstream from the apparatus may be 500 p.s.i. while the pressure downstream is 250 p.s.i. The pressure differential is more than sufficient to urge the apparatus 12 through the pipeline 10.

The test apparatus 12 incorporates a somewhat streamlined front portion as indicated at 16. The front end portion 16 is centered in the pipe by a number of bow members 18 which protrude from the nose portion 16 and which position the test apparatus 12. It will be understood that the pipe 10 is normally round in configuration. While slight variations in manufacture may occur, the bow members 18 position the apparatus approximately in the center of the pipe 10. The test apparatus 12 formed of a solid member or may be of hollow construction with a closed skin to house the various components as will be described. In either event, the body proper is indicated by the numeral 20 and preferably includes sufficient structure to support the bow members 18 and a resilient skirt 22. The resilient skirt 22 is anchored at two points. It is anchored in two circling recessed beads at 24 and 26. The contour of the skirt is particularly significant. The skirt should be streamlined as the pipe moves forward through the pipe. The streamlining creates a minimum of drag in the fluid in the pipe, and thus, the test device 12 is readily translated along the pipeline. On the rearward face, however, the skirt 22 protrudes essentially directly outwardly to be responsive to the pressure acting across the test apparatus 12. The rearward portions of the skirt are responsive to the pressure increase which helps set the device and which forces the skirt more firmly against the outer wall of the pipe 10. It will be understood that flowby is prevented when the skirt is fully pushed against and sealed against the inner wall of the pipe 10. More will be noted concerning the sealing of the skirt hereinafter.

The pipe 10 is customarily used to flow material from one point to another. The test apparatus 12 is placed in the pipeline at some point of access and traverses the pipeline 10. The test apparatus preferably responds to pressures controlled from a pumping station to be set or released as will be described. The test apparatus 12 includes a central passage 28 permitting the fluid to flow through the test apparatus. The passage 28 communicates with a chamber 30 and then is exhausted through a forwardly directed passage 32. Communication through the apparatus 12 is completed by the three passages named above. In the central chamber 30 is located a needle valve member 34.

Figure 2:
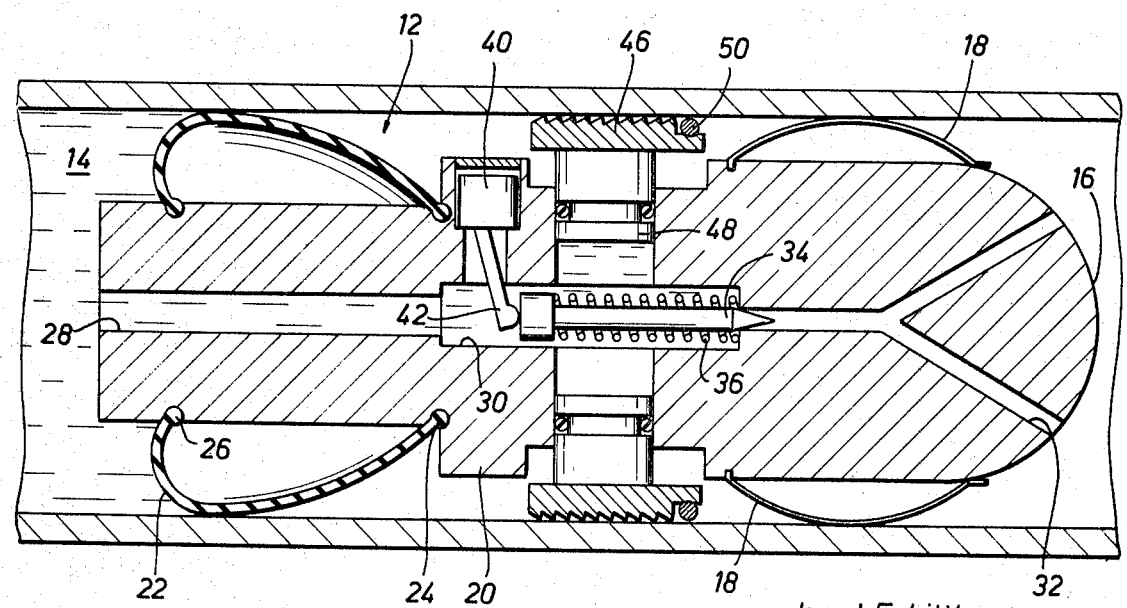
FIG. 2 is a view similar to FIG. 1 except that the apparatus has been set by an increase in pressure to thereby fix its position in the pipeline and to test a portion of the pipeline upstream.

Fluid communication is permitted through the test apparatus 12 via the passages subject to control by the needle valve member 34. The needle valve 34 is held in position by a resilient spring 36 which tends to keep the neck of the opening or passage 32 open. Hence, the illustrated position of FIG. 1 permits fluid flow through the passage 32. By way of contrast, the valve member 34 closes off the passage 32 as shown in FIG. 2 to block flow through the passage. The function of this will be more readily apparent hereinafter.

Several techniques are available for setting the valve member 34 in the valve seat to close off fluid flow through the test apparatus 12. Preset tensioning of the spring 36 is an acceptable technique. Additionally, the valve member may be mechanically set which is the method chosen for the preferred embodiment. In FIG. 1, the numeral 40 identifies a motive means which operates a lever 42 which moves the valve 34. As will be understood, a minimum of power is needed to set the needle valve in the valve seat. After the valve has been set, pressure in the pipeline will maintain the valve in its seat. The mechanism 40 is used to overcome the initial resistance of the spring 36 whereupon the pressure in the pipeline will hold the valve closed thereafter. Preferably, the means 40 and 42 comprise a solenoid connected to the lever arm 42 which pulls the arm 42, causing it to rotate about a pivot point to set the needle valve 34. A mechanical latch can be used at the extremity of movement, however, the hydraulic latching technique described above is preferable for the apparatus.

The timing of the operation of the means 40 may be controlled in several ways. It may be helpful to use a self-contained timer clock to actuate the means. On the other hand, it may be preferable to utilize a remote radio transmitter and conventional radio receiver in the pressure test apparatus 12, to actuate the means 40. This allows more flexibility in that the test apparatus 12 may be stopped at any location to initiate a test. In some places, the pipeline 10 may be so situated that a test beginning at a particular point is considered very desirable. This might happen when the pipeline emerges from a river bed. It would be quite desirable to test only the portion of pipeline exposed to the river for leakage. A first test is run with the test apparatus just at the upstream side of the river. After this test is run and suitable leakage rates and pressure holding characteristics are obtained, the test apparatus is moved downstream to a point where the pipeline departs from the river bed. Again, the test is run with the test apparatus at this location and suitable data is obtained to test that portion of the pipeline exposed to the river bed. It is believed that details of construction of a transmitter and receiver are well known.

Attention is next directed to FIG. 2 of the drawings which shows the test apparatus 12 fixed in position against the increased upstream pressure. The apparatus preferably uses several sets of slips indicated by the numeral 46 having appropriate gripping surfaces which engage and hold the test apparatus against the pipeline 10. The slips 46 are moved outwardly in response to hydraulic pistons 48 in radially outwardly directed cylinders in the body of the test apparatus 12. The cylinders are communicated with the enlarged chamber 30 to receive pressure fluid from the upstream side of the pipeline. As shown in the drawings, the pistons 48 are equipped with suitable piston rings to prevent leakage of the fluid past the piston, a leakage which would be mistaken for leakage in the pipeline.

Figure 3:
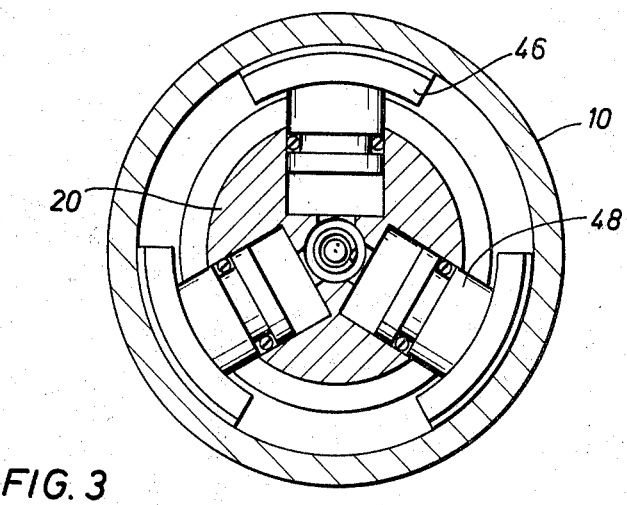
FIG. 3 is a sectional view through the apparatus of FIG. 2 illustrating details of the slips which set the equipment at a particular location.

The slips 46 are preferably three in number as shown in FIG. 3. The slips are equipped with serrated edges or surfaces to enhance the gripping of the inner wall of the pipe 10. The serrations are pointed downstream to improve the grip and resist the increased upstream pressure which sets the apparatus. The slips are held in position by an encircling coil spring indicated by the numeral 50 as shown in FIGS. 1 and 2. The coil spring is relatively weak so that the hydraulic pressure operating on the cylinders overcomes the coil spring easily. However, when the upstream pressure is dropped, the coil spring forces the slips back to the retracted position of FIG. 1 to streamline the apparatus and to ease and improve its movement through the pipeline 10. Consequently, the spring means 50 serves as a return mechanism for the slip means described herein.

While the foregoing describes details of construction of the present invention, the test apparatus 12 is preferably described in operation to enhance the understanding thereof. Preferably, the apparatus is made in numerous sizes to accommodate pipelines of various sizes. It may be helpful to utilize only a single body for a given range of pipe diameters and to substitute bow members 18 and the sealing gasket member 22 for different sizes of pipelines. In any event, the apparatus is placed in the pipeline at the point of access and the upstream pressure is increased to move the test apparatus 12 along the pipeline. As will be noted, fluid passes from the upstream side to the downstream side of the test apparatus through the central passages. However, sufficient pressure differential exists across the test apparatus to provide a driving force moving the apparatus downstream. The apparatus is centered by sealing gasket 22 and the bow members 18. The apparatus traverses a predetermined distance and the first test is then performed. The test apparatus 12 is then set at a predetermined location in the following manner. As mentioned before, several techniques may be used to set the apparatus. An increase in upstream pressure will overcome the spring 36 and force the needle valve member 34 into the valve seat. This then seals off the apparatus against fluid communication therethrough. Alternatively, the mechanism 40 is operated to move the lever arm 42 such that the valve member 36 is forced into the seat as shown in FIG. 2. Once the valve member is seated, the upstream side is deprived of its leakage through the apparatus and the pressure drop across the apparatus becomes greater. This maintains the valve member in the seated position of FIG. 2.

In response to the increased pressure, the gasket 22 will bow slightly to seat against the wall of the pipe 10. Also, in response to increased pressure differential acting across the test apparatus 12, the pistons 48 are moved radially outwardly in their respective cylinders to urge the slips 46 against the pipeline 10. As described above, the slips provide an increased frictional engagement with the walls of the pipeline 10 to set and hold the test apparatus at a particular location. Outward movement of the slips 46 is against the weak return force of the encircling coil spring 50 which is an apparatus or means for returning the slips to their initial position after the test is over. Once the apparatus is set, leakage past the apparatus is essentially nonexistent. The tests of the pipeline are then run. Typically, the pipeline is tested by increasing the pressure to a predetermined level and measuring the leakage rate of the section under test. Routinely, the test pressure is held for a predetermined interval.

Once a test is completed, the test apparatus of the present invention is then moved to another downstream position to run another test. This is accomplished in the following manner. The higher or increased pressure upstream of the test apparatus is substantially reduced. When the pressure differential acting across the valve member 34 is reduced, the spring 36 forces the valve from the valve seat to open a passage through the test apparatus 12. This then further reduces the upstream pressure on the test apparatus 12. Then, the pressure tester is unanchored from its position because the reduced pressure permits the slips 46 to be returned from their engaging position. The slips are retracted and the apparatus is no longer firmly held in position. Then, the upstream pressure may be increased gradually to accelerate the test apparatus through the pipe 10. As the upstream pressure is then gradually increased, the pressure differential acting across the test device forces it at a greater rate of speed along the pipe 10 to a position for another test.

Figure 4:
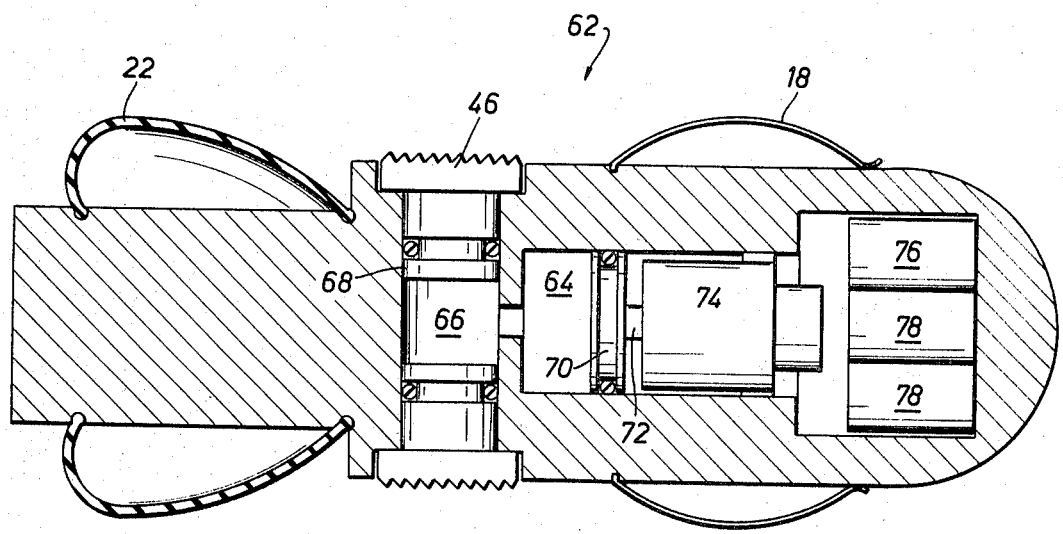
FIG. 4 is a sectional view of an alternative embodiment of the present invention.

Attention is next directed to FIG. 4 of the drawings which shows an alternative embodiment of the present invention which is indicated by the numeral 62. The device includes similar bow members 18 which center the apparatus in the pipe, and further includes a rear skirt 22 which seals in pressure as described before. The apparatus likewise includes a plurality of slips 46 which are preferably similar in construction to those described hereinbefore. The significant point of difference lies in the operating means for the slips 46. As will be observed, no central passage through the apparatus is provided. But rather, the means for setting the slips are self contained. The apparatus preferably includes a closed hydraulic chamber 64 which is filled with hydraulic fluid. The chamber 64 is communicated with the cylinders 66 in which are located the various pistons 68. Preferably, the apparatus includes three slips mounted on individual pistons in the manner shown in FIG. 3 above. A piston 70 is located in the chamber 64. The piston 70 is moved in the chamber 64 by a piston rod 72 which is driven by an electric motor operating through a suitable gearbox to move the piston rod 70. The exact nature and description of the motor is believed immaterial as are details of construction of the gearbox. The motor preferably runs for a short interval and upon being geared down, imparts transverse motion to the piston rod through a rack and pinion to urge the hydraulic piston 70 to the left. The motive means is indicated by the numeral 74 and is operated in response to a radio receiver indicated generally at 76 and is suitably powered by batteries represented generally at 78 in the drawings.

The apparatus is operated in response to a transmitted radio signal. The transmitter is positioned preferably externally of the pipe and transmits a signal of a known frequency to the radio receiver 76. In the preferred embodiment, the presence of a signal operates the motive means 74. Suitable power is obtained from the storage batteries 78 to drive the motor for a desired interval at which time the hydraulic cylinder 70 is urged to the left to hydraulically force the pistons 68 outwardly of the apparatus. The slips are set to thereby permit the pressure test of the pipeline to be initiated. The slips are retrieved in the reverse manner. Preferably, the motor for the motive means 74 is a bidirectional reversible motor and, preferably, an alternative frequency is used to transmit a signal to the receiver 76 which reverses operation of the motor to return the hydraulic piston 70 to its original position. This reduces the hydraulic pressure in the closed system and the slips are then withdrawn. Preferably, withdrawal of the slips is accomplished through the hydraulic means described above, although it may be enhanced through the utilization of an encircling coil spring (not shown) in the manner of the embodiment 12 described above.

It is believed that operation of the embodiment 62 is readily understood in view of the description included hereinbefore. Consequently, the details of operation are believed readily apparent and reference is made to the foregoing for a more complete understanding of the embodiment 62.

While many alterations and variations of the present invention may be envisioned, the scope of the present invention is determined by the claims appended hereto.

I claim:

1. Apparatus adapted for selective pressure testing of pipelines and comprising: an elongated body adapted to be moved axially through a pipeline; sealing means mounted around said body and adapted to be in sealing sliding contact with the internal walls of a pipeline containing said apparatus for propelling said apparatus therethrough upon imposition of an upstream fluid pressure behind said sealing means greater than the downstream fluid pressure there ahead to develop a selected pressure differential; first passage means along said body and adapted for bypassing pipeline fluids therethrough as said apparatus is being propelled through a pipeline; means adapted for releasably anchoring said apparatus against continued forward movement in a pipeline and including wall-engaging means operatively arranged on said body ahead of said sealing means and adapted for movement outwardly into anchoring engagement with such internal pipeline walls, piston means on said body and operatively arranged for selectively moving said wall-engaging means outwardly in response to pressure differentials greater than said selected pressure differential, and second passage means adapted for communicating such upstream fluid pressures to said piston means; and means adapted for selectively controlling fluid communication through said first passage means and including valve means adapted for opening and closing said first passage means, first means normally retaining said valve means open at pressure differentials no greater than said selected pressure differential, and second means adapted for closing said valve means in response to upstream fluid pressures producing pressure differentials greater than said selected pressure differential.

2. The apparatus of claim 1 wherein said valve means include a valve seat defined in said first passage means, and a valve member movably disposed in said first passage means upstream of said valve seat and adapted for selective movement therein into and out of seating engagement with said valve seat.

3. The apparatus of claim 2 wherein said first means include biasing means arranged between said valve member and said body and adapted for retaining said valve member out of seating engagement with said valve seat so long as said selected pressure differential is not exceeded.

4. The apparatus of claim 2 further including means responsive to electromagnetic signals and adapted for urging said valve member into seating engagement with said valve seat once said selected pressure differential is exceeded.

5. The apparatus of claim 4 wherein said first means include biasing means arranged between said valve member and said body and adapted for retaining said valve member out of seating engagement with said valve seat so long as said selected pressure differential is not exceeded.

6. The apparatus of claim 5 further including biasing means coupled to said wall-engaging means and adapted for retracting said wall-engaging means so long as said selected pressure differential is not exceeded.